(12) United States Patent
Correia

(10) Patent No.: US 6,357,014 B1
(45) Date of Patent: Mar. 12, 2002

(54) DEVICE FOR MONITORING THE PERIODICITY OF THE MESSAGES SENT OVER A MULTIPLEXED TRANSMISSION NETWORK WITH A CAN-TYPE STRUCTURE

(75) Inventor: Paul Correia, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/094,023

(22) Filed: Jun. 9, 1998

(51) Int. Cl.[7] ................................................ G06F 1/14
(52) U.S. Cl. ......................................... 713/502; 714/51
(58) Field of Search ............................... 713/400, 502, 713/600; 714/51, 55; 709/224

(56) References Cited

U.S. PATENT DOCUMENTS

| | | | | |
|---|---|---|---|---|
| 4,090,239 A | * | 5/1978 | Twibell et al. | 713/502 |
| 4,680,753 A | * | 7/1987 | Fulton et al. | 370/449 |
| 5,809,220 A | * | 9/1998 | Morrison et al. | 714/12 |
| 5,944,792 A | * | 8/1999 | Yamato et al. | 709/219 |

* cited by examiner

*Primary Examiner*—Dennis M. Butler
(74) *Attorney, Agent, or Firm*—William B. Kempler; Frederick J. Telecky, Jr.

(57) ABSTRACT

Device for monitoring the periodicity of the messages sent over a multiplexed data-transmission network, in particular of a motor vehicle, characterized in that it includes a memory (4) for storing object messages which are received from the network and each have a value (8) indicating the reception deadline of the message, local clock means (9) which are synchronized by a periodic internal signal and continuously generate a local time-value signal, means (13) for comparing each message-reception deadline value (21, 22, 23) with the local time value and for generating an overdue signal when the value indicating the reception deadline of the message is less than or equal to the local time value, and means (15) for generating a signal, intended for an external microcontroller (5) and indicating that the message has not been received, on the basis of the overdue signal.

4 Claims, 1 Drawing Sheet

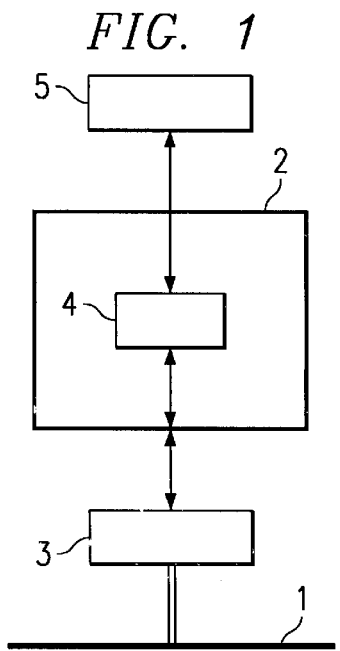
FIG. 1
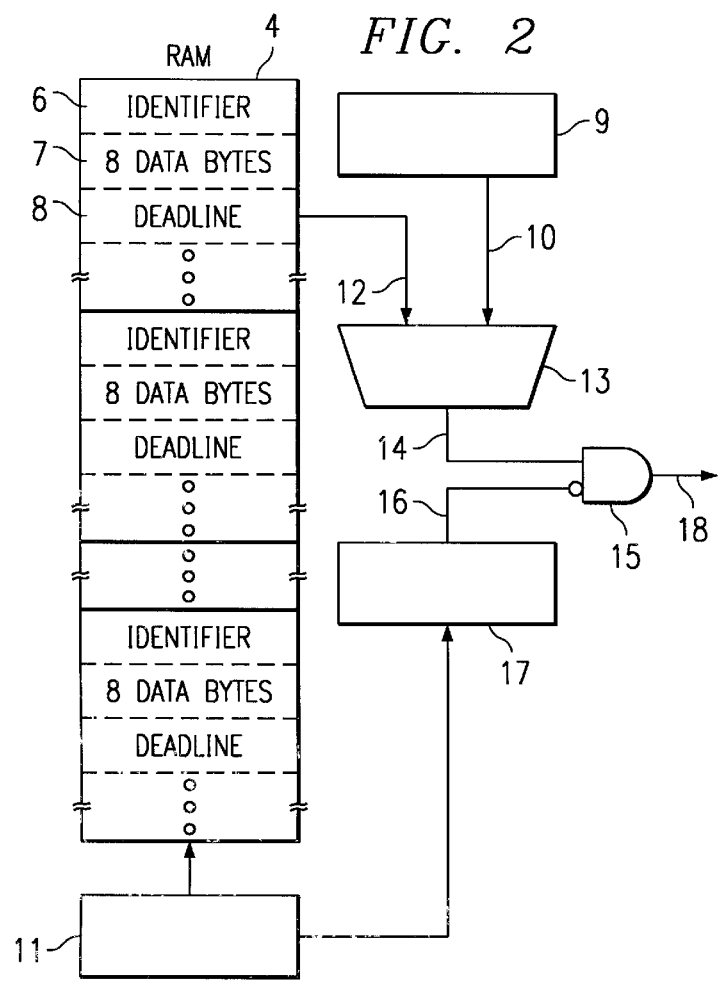
FIG. 2
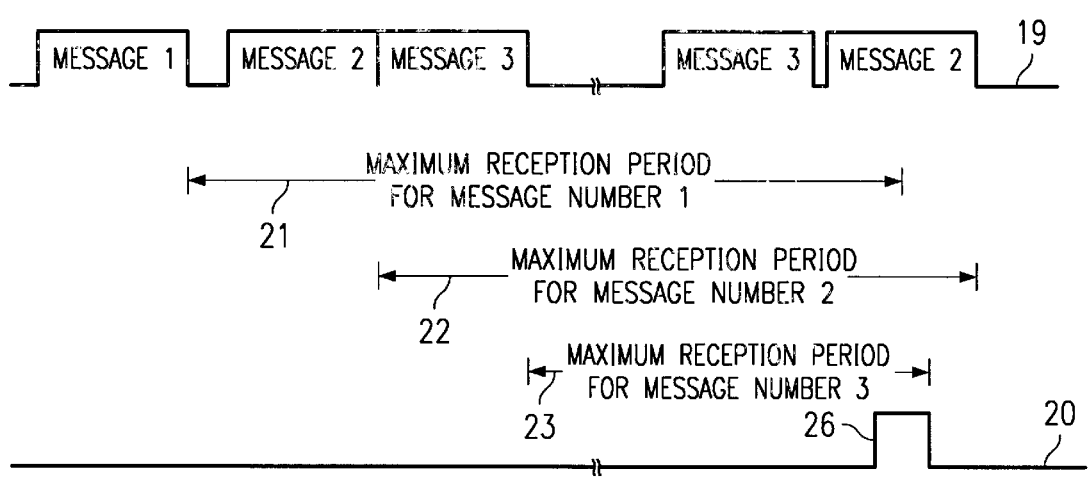
FIG. 3
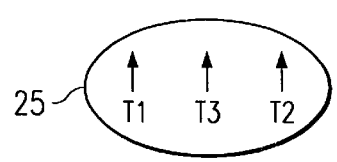

DEVICE FOR MONITORING THE PERIODICITY OF THE MESSAGES SENT OVER A MULTIPLEXED TRANSMISSION NETWORK WITH A CAN-TYPE STRUCTURE

The present invention relates to a device for monitoring the periodicity of the messages sent over a multiplexed data-transmission network, in particular of a motor vehicle, and especially on a network of the CAN type.

It applies to any monitoring system based on a microcontroller and a bus network controller, in particular of the CAN type, requiring the supervision of the messages sent over the network with an application-specific periodicity.

When data are transmitted periodically on a network of the CAN type, all the controllers which are connected to this network and use the messages containing these data must make sure that the messages have actually been transmitted in a time window allocated by the application in question.

If a message has not been received at the end of a period assigned to it, this may indicate that the controller tasked with transmitting this message is faulty. The controller using these data should be informed of this as soon as possible in order to avoid the use of obsolete data.

At present, the supervision of the periodicity of the messages is entirely undertaken by the microcontroller. This is not generally a problem when the number of messages is small.

When the number of messages becomes large, and these messages have a different and uncorrelated periodicity, the task of the microcontroller becomes too great for the application to be processed correctly.

The object of the invention is to create a device for monitoring the periodicity of the messages sent over a network of the CAN type, which frees the microcontroller from systematically supervising the messages transmitted periodically on the CAN-type network.

It therefore relates to a device for monitoring the periodicity of the messages sent over a multiplexed data-transmission network, in particular of a motor vehicle, characterized in that it includes a memory for storing object messages which are received from the network and each have a value indicating the reception deadline of the message, local clock means which are synchronized by a periodic internal signal and continuously generate a local time-value signal, means for comparing each message-reception deadline value with the local time value and for generating an overdue signal when the value indicating the reception deadline of the message is less than or equal to the local time value, and means for generating a signal, intended for an external microcontroller and indicating that the message has not been received, on the basis of the overdue time signal.

The invention will be understood more clearly with the aid of the following description, given solely by way of example and with reference to the appended drawings, in which:

FIG. 1 is a general diagram showing the implementation of a communication controller according to the invention;

FIG. 2 shows the internal architecture of the communication controller according to the invention; and FIG. 3 is a graph showing an example of a sequence of various messages with different periods.

FIG. 1 depicts a portion of a CAN network, in the form of the CAN bus 1 to which a CAN communication controller 2 is connected via a CAN line interface 3.

The CAN communication controller 2 has a communication memory 4 of the RAM type, connected on the one hand to the CAN network 1 in order to save the data received via the CAN bus 1 and, on the other hand, to an external microcontroller 5.

The shared memory 4 is used by the CAN network controller 2 to save the data received via the CAN bus 1.

The CAN communication controller depicted in FIG. 1 includes the RAM memory 4.

The RAM receives the data to be transmitted over the network by the microcontroller 5, which accesses this memory like a conventional RAM. Once the data have been loaded in memory, the network controller will read these data to send them serially over the network.

The RAM also receives the data which are received serially from the network and are intended for the microcontroller, which will read this memory like the conventional RAM once the message has been received.

The RAM may equally well consist of a dual port RAM or a conventional RAM with a single access port, equipped with an internal selection device (not shown) for directing the data from the RAM either to the microcontroller 5 or else to the CAN network controller.

This memory contains data which, for each message to be saved, comprise an identifier 6 and data 7.

The group comprising the identifier 6 and the data 7 is referred to as the object message.

An object message may also contain other data relating to the message, for example the arrival time of the messages, or the like.

There is no limit on the number of object messages which can be saved in the memory 4. It depends only on the size of the memory.

For each object message, a value 8 indicating the reception deadline of the message is recorded by the microcontroller 5 in the memory 4.

As represented in FIG. 2, the controller according to the invention furthermore includes a local clock 9 synchronized by a periodic internal signal, for example the clock of the system or the throughput clock of the CAN network.

The clock 9 continuously generates a local time value on its output 10.

A sequencer 11 supplies the memory 4 with address signals corresponding to the object messages whose appearance is to be monitored.

It makes it possible to access each deadline value 8 of each object message in turn.

The corresponding output 12 of the memory 4 is connected to a magnitude comparator 13 with the local clock signals 9.

The output 14 of the magnitude comparator 13 is connected to a first input of an AND gate 15, an inverted second input of which is connected to the output 16 of a reception indicator 17.

The input of the reception indicator 17 is connected to an output of the sequencer 11.

The output 18 of the gate 15 delivers an indication that the message has not been received.

The indication of reception ensures the storage of the reception of a message for each of the object messages.

The sequencer 11 selects the current object message, the deadline of which, appearing at the output 12 of the RAM 4, is undergoing comparison.

If a message has been received for this object message, the output signal of the reception sequencer 17, appearing at its output 16, is then set.

The combination of the overdue time signal appearing at the output of the comparator 13 and the message reception signal appearing at the output 16 of the reception indicator 17 makes it possible for a signal indicating that the message has not been received to be generated at the output 18 of the gate 15.

The course of a sequence of receiving a plurality of messages is described with reference to FIG. 3.

The line 19 in the diagram depicted in this figure indicates messages Msg1, Msg2, Msg3 over time.

The line 20 represents an alarm message output if a message has not been received when a specific period has elapsed.

After reception of the message Msg1, it is known that the next reception of this same message should occur before the instant 21.

The same is true as regards the messages Msg2 and Msg3, which should be respectively received before the instants 22 and 23.

Each of these messages has its own maximum period.

Furthermore, all these messages can be sent completely asynchronously, that is to say without any time correlation between them.

All the deadlines may therefore be quite close to one another, as indicated at 25 by the instants t1, t2, t3 at which the messages Msg1, Msg2, Msg3 should again appear.

At this particular instant, a situation of this type entails a high workload for the microcontroller.

It is then no longer possible for all the deadlines to be observed appropriately.

The device which has just been described fully frees the microcontroller of supervising the messages sent over the network.

In the example in FIG. 3, since the message Msg1 has not been received when the time 21 elapses, an alarm signal 26 is automatically generated by the CAN network when a signal indicating that the message has not been received appears at the output of the communication controller 2, as described with reference to FIG. 2.

When a message has been received, the microcontroller 5 informs the network controller of the arrival time of the next message. The microcontroller 5 is then freed from monitoring the messages.

It will be informed of the arrival of the message or of the lack of reception of the message by the can network controller 2.

What is claimed is:

1. Device for monitoring the periodicity of the messages sent over a multiplexed data-transmission network, in particular of a motor vehicle, characterized in that it includes a memory (4) for storing object messages which are received from the network and each have a value (8) indicating the reception deadline of the message, local clock means (9) which are synchronized by a periodic internal signal and continuously generate a local time-value signal, means (13) for comparing each message-reception deadline value (21, 22, 23) with the local time value and for generating an overdue signal when the value indicating the reception deadline of the message is less than or equal to the local time value, and means (15) for generating a signal, intended for an external microcontroller (5) and indicating that the message has not been received, on the basis of the overdue signal.

2. Monitoring device according to claim 1, further comprising a sequencer (11) which is connected, on the one hand, to the memory (4) and, on the other hand, to a message-reception indicator (17) connected to the means (15) for generating a signal that the message has not been received, and is intended to deliver to the memory (4) address signals corresponding to the object messages whose occurrence needs to be monitored.

3. Monitoring device according to claim 2, wherein the memory (4) for storing object messages is a RAM.

4. Monitoring device according to claim 1, wherein the memory (4) for storing object messages is a RAM.

* * * * *